US007529321B1

(12) United States Patent
Shiraishi et al.

(10) Patent No.: US 7,529,321 B1
(45) Date of Patent: May 5, 2009

(54) RADIO DIGITAL SIGNAL RECEIVER

(75) Inventors: Kenichi Shiraishi, Yokohama (JP);
Shoichi Suzuki, Yokohama (JP);
Akihiro Horii, Zama (JP); Shoji Matsuda, Machida (JP); Takahiro Wada, Yokohama (JP)

(73) Assignees: Kabushiki Kaisha Kenwood, Tokyo (JP); Leader Electronics Corporation, Kanagawa (JP)

( * ) Notice: Subject to any disclaimer, the term of this patent is extended or adjusted under 35 U.S.C. 154(b) by 0 days.

(21) Appl. No.: 09/805,766

(22) PCT Filed: Sep. 17, 1999

(86) PCT No.: PCT/JP99/05088

§ 371 (c)(1),
(2), (4) Date: Mar. 16, 2001

(87) PCT Pub. No.: WO00/18077

PCT Pub. Date: Mar. 30, 2000

(30) Foreign Application Priority Data

Sep. 18, 1998 (JP) .................................. 10-282046

(51) Int. Cl.
*H04L 27/22* (2006.01)
(52) U.S. Cl. ..................................... 375/329
(58) Field of Classification Search ................ 375/316, 375/329, 327, 260, 326, 331, 381, 324
See application file for complete search history.

(56) References Cited

U.S. PATENT DOCUMENTS 5,027,371 A * 6/1991 Sehier et al. ................ 375/235
5,406,429 A * 4/1995 Noguchi et al. ............... 360/65
5,572,516 A * 11/1996 Miya et al. .................. 370/342
5,909,384 A * 6/1999 Tal et al. ..................... 708/322
6,081,228 A * 6/2000 Leimer .................. 342/357.02
6,341,224 B1 * 1/2002 Dohi et al. .................. 455/522

FOREIGN PATENT DOCUMENTS

| JP | 02-044937 | 2/1990 |
| JP | 02-046045 | 2/1990 |
| JP | 06-315040 | 11/1994 |
| JP | 07-015482 | 1/1995 |
| JP | 08-273302 | 10/1996 |
| WO | WO9750197 | * 12/1997 |

OTHER PUBLICATIONS

Notification of Refusal Reason dated Oct. 28, 2004 for JP 282046/1998.
International Search Report.

* cited by examiner

*Primary Examiner*—Kevin M Burd
(74) *Attorney, Agent, or Firm*—Eric J. Robinson; Robinson Intellectual Property Law Office, P.C.

(57) ABSTRACT

A digital satellite broadcast receiver capable of an optimum signal reception even when an arbitrary outdoor unit is connected. Please noise characteristics of an outdoor unit connected to a digital satellite broadcast receiver when receiving a burst symbol is estimated based on a bit error rate of an 8PSK modulation signal determined by a trellis decoder (7) when a CNR measured by a CNR measurement circuit (5) is equal to a preset value, and, based on the estimated phase noise characteristics of the outdoor unit, a filter factor of a loop filter (9) inserted into a carrier regenerative loop is set.

4 Claims, 5 Drawing Sheets

RADIO DIGITAL SIGNAL RECEIVER

TECHNICAL FIELD

The present invention relates to a radio digital signal receiver and, more in particular, to a digital satellite broadcast receiver for changing characteristics of a carrier regenerative loop in accordance with a bit error rate at a received C/N (hereinafter, also described as an CNR).

BACKGROUND ART

The receiver for the digital satellite broadcast scheduled to start in the year 2000 is supposed to employ an antenna element for receiving the present analogue satellite broadcast and a down-converter for converting the output of the antenna element into BS-IF frequency, thereby receiving the digital satellite broadcast. Generally, the antenna element and the down-converter are installed outside and referred to as an outdoor unit. Hereinafter, the outdoor unit is also described as an ODU.

The receiving system for receiving the digital satellite broadcast, for example, the receiving system of CS broadcast stipulates that desirable phase noise characteristics of a local oscillator inside the down-converter used in the exclusive ODU have a phase noise ($\theta$ rms) within 4 degrees and, when the phase noise ($\theta$ rms) is within 4 degree, the receiving performance of the receiver is scarcely affected.

On the other hand, in the receiving system of the digital satellite broadcast, the existing ODU for the analogue broadcast can be used and generally the performance of the existing ODU is not good. The characteristic distribution of the phase noise of the local oscillator of the existing antenna, which was sample-studied by Association of Radio Industries and Business (abbreviated as ARIB), was as shown in FIG. 4.

At present there exists no standard concerning the phase noise for those planned as a new system. However, the phase noise characteristic thereof is expected to be the same degree as that of the above-described CS broadcast receiving system and, when the phase noise is not more than 4 degrees, the receiving performance of the receiver is not affected and no problem can be expected to arise. However, the existing ODU, especially the local oscillator having a large phase noise ($\theta$ rms) damages the receiving performance of the receiver.

Shown in FIG. 5 are the critical C/N characteristics by the phase noise ($\theta$ rms) of the local oscillator inside the down-converter of the ODU for a 8PSK (Trellis coded 8PSK) modulating signal in a burst symbol reception. Here, the system for regenerating a carrier from only the BPSK modulating signal referred to as a burst symbol signal which is intermittently transmitted is termed the burst symbol reception. Shown in FIG. 6 are critical C/N characteristics by the phase noise ($\theta$ rms) (of the local oscillator) for the 8PSK modulating signal in a continuation reception. Here, the continuation reception refers to a system for regenerating a carrier from a received signal.

In FIG. 5, the characteristics of a carrier regenerative loop are shown by a critical CNR for each of three kinds of characteristics a, b and c. The characteristic a as shown in FIG. 5 is a critical C/N where a noise bandwidth is made narrow and when the phase noise exceeds 15 degrees no reception is possible. The characteristic c as shown in FIG. 5 is a critical C/N where the noise bandwidth is made large and a reception is possible even when the phase noise is about 30 degrees. However, a fixed deterioration at a time when the phase noise is about less than 10 degrees becomes large in contrast to the characteristic a as shown in FIG. 5. The characteristic b as shown in FIG. 5 is a critical C/N which is intermediate between the case of the characteristic a as shown in FIG. 5 and the case of the characteristic c as shown in FIG. 5.

As can be seen by comparing a of FIG. 5 with FIG. 6, in case of the burst reception, the receiving performance becomes deteriorated when the phase noise becomes large depending on the characteristics of the carrier regenerative loop, while in case of the continuation reception, even with the noise bandwidth of the characteristic a as shown in FIG. 5, the fixed deterioration is lessened and the receiving performance is improved.

Now, the receiving system of the digital BS broadcast receiver will be described. In the digital BS broadcast system, a 8PSK modulation, a QPSK modulation and a BPSK modulation are adapted as modulating systems and the modulated wave thereof is time-divisionally-multiplexed and transmitted as shown in FIG. 7.

FIG. 7($a$) shows the configuration of one super frame, which comprises eight frames in total. In each frame, a BPSK-modulated frame synchronous pattern as shown by the first oblique lines (32 symbols), a BPSK-modulated TMCC pattern for discriminating a transmission and multiplex configuration (128 symbols), then a BPSK-modulated super frame discrimination pattern (32 symbols), a main signal of 203 symbols, a BPSK-modulated burst symbol signal as shown by cross-oblique lines (4 symbols) and subsequently a main signal and a burst symbol signal are repeated in order, thereby configuring one frame with 39936 symbols. The main signal as shown in FIG. 7($b$) is a 8PSK/QPSK/BPSK-modulating signal.

Because the modulated wave by a modulating system where the required C/N (the C/N required for demodulation) varies as the number of phases varies as eight, four and two like the 8PSK/QPSK/BPSK-modulating signal is time-divisionally-multiplexed, the BPSK-modulating signal of 4 symbols is embedded at a specific period (mainly at intervals of 203 symbols) in order to compensate for the carrier regenerative characteristics in the case where the modulating system having a number of phases is difficult to obtain reception especially at a low C/N time. The BPSK-modulating signal of the 4 symbols is termed a burst symbol signal and the system for regenerating a carrier from only the BPSK-modulating signal which is referred to as the burst symbol signal is termed the burst symbol reception as described above.

As described above, in the place where there are few phase noises, the receiving performance (the critical CNR) remains almost unchanged in case of either the burst symbol reception or the continuation reception and no problem is expected to arise. However, in the place where there are many phase noises, quite different from the continuation reception, there arises a problem for the burst symbol reception in that the critical CNR fluctuates largely according to the characteristics a, b and c of the carrier regenerative loop.

This problem will be described further in detail. By scanning a carrier frequency through the AFC circuit inserted into the carrier regenerative loop, frame synchronization is established, and when carrier regeneration is made by the burst symbol reception, Reed-Solomon error of the main signal can be checked. If the received CNR is good, the Reed-Solomon error will be eliminated and the receiving system will be switched over from the burst symbol reception to the continuation reception.

Nevertheless, when the characteristic a as shown in FIG. 5 is selected as the characteristic of the carrier regenerative loop, the Reed-Solomon error will occur in the case where the phase noise is large so that the receiving system can not be switched over to the continuation reception. As a result, the main signal is no longer regenerated indefinitely. Note that what is meant by the critical CNR as shown in FIG. 5 and FIG. 6 is the critical value where the error rate after a trellis code is decoded is $2\times10^{-4}$ and which, after the Reed-Solomon is decoded, becomes error-free.

On the other hand, when the characteristic c as shown in FIG. 5 is selected as the characteristic of the carrier regenerative loop, the Reed-Solomon error will be eliminated if the received CNR is good even if the phase noise is large and the receiving system can be switched over to the continuation reception. However, as can be seen by comparing the characteristic c as shown in FIG. 5 with the characteristic as shown in FIG. 6, because the value of the critical CNR of the burst reception differs from the value of the critical CNR of the continuation reception practically irrespective of the phase noise characteristics, when the receiving system is switched over, hysteresis will occur.

However, in the situation where it is not clear which type of the ODU is to be used ultimately, it is safe to adapt the later, that is, (c) as shown in FIG. 5 for the characteristic of the carrier regenerative loop so that, whichever type of reception systems is used, it can obtain a basic reception. As a result, in spite of the fact that the digital only or the existent high performance ODU is used, a problem arises in that the receiving performance is not improved.

An object of the present invention is to provide a digital satellite broadcast receiver capable of expecting an optimum reception when the exclusive ODU or the existing high performance ODU is connected.

DISCLOSURE OF THE INVENTION

The radio digital signal receiver according to the present invention is characterized in that it comprises means for estimating phase noise characteristics at a reception time of the outdoor unit connected to a receiving terminal of the radio digital signal receiver from a decoded error rate of the digital signal and means for setting the characteristics of the carrier regenerative loop based on the estimated phase noise characteristics of the outdoor unit.

In the preferred embodiment of the radio digital signal receiver of the present invention, the above described estimating means estimate the phase noise characteristics of the outdoor unit based on a bit error rate of the specific polyphase PSK-modulating signal when the received CNR has a predetermined value in a burst symbol reception mode for regenerating a carrier from a burst symbol signal.

Also, the above means for setting the characteristics of the loop preferably sets a filter factor of a loop filter inserted into the carrier regenerative loop.

Moreover, in the preferred embodiment, the above described burst symbol signal is a BPSK-modulating signal and the above described specific polyphase PSK-modulating signal is a 8PSK-modulating signal.

DETAILED DESCRIPTION OF THE PREFERRED EMBODIMENT

Hereinafter, a digital satellite broadcast receiver will be described based on the preferred embodiment.

Figure 1:
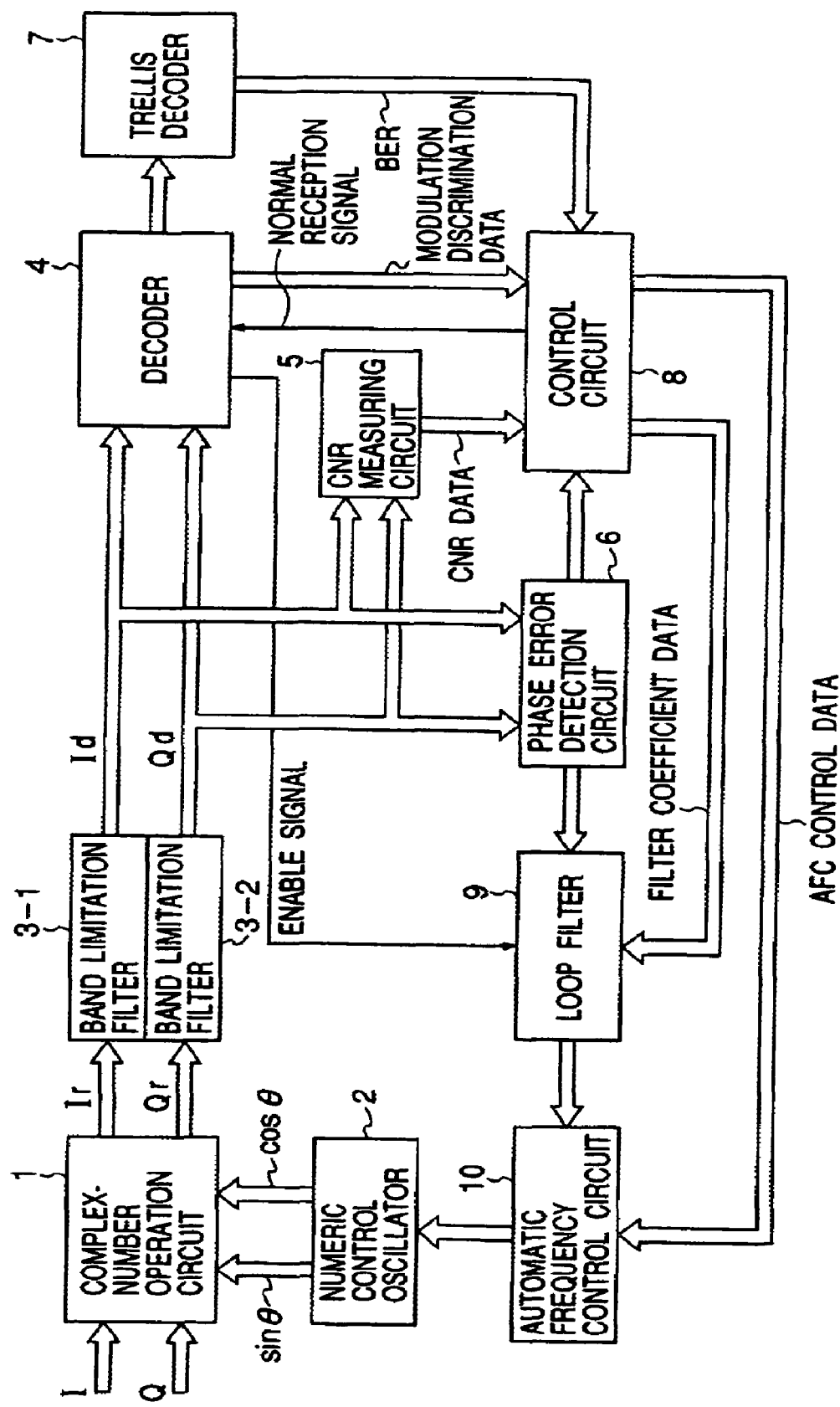
FIG. 1 is a block diagram showing the configuration of a carrier regenerative portion in the digital satellite broadcast receiver according to an embodiment of the present invention.

FIG. 1 is a block diagram showing the configuration of a carrier regenerative portion in the digital satellite broadcast receiver according to an embodiment of the present invention.

The base band signals I, Q which are orthogonally detected and A/D converted in a tuner portion are inputted to a complex-number arithmetic operation circuit 1, and the base band signals I, Q, a sine wave data $\sin \theta$ which is a practically recovered carrier data outputted from a numeric control oscillator (NCO) 2 and a cosine wave data $\cos \theta$ are processed with Ir ($=$I $\cos \theta$+Q $\sin \theta$) arithmetic operation and Qr ($=$I $\sin \theta$+Q $\cos \theta$) arithmetic operation in the complex-number arithmetic operation circuit 1 and quasi-synchronously detected, so to speak, thereby outputting the base band signals Ir, Qr from the complex-number arithmetic operation circuit 1.

The base band signals Ir, Qr which are outputted from the complex-number arithmetic operation circuit 1 are supplied respectively to band limiting filters 3-1, 3-2 which comprise digital filters and band-limited. The base band signals Id, Qd which were band-limited at the band limiting filters 3-1, 3-2 are supplied to a decoder 4, a CNR measurement circuit 5 and a phase error detection circuit 6. The decoder 4 performs the decoding of the frame synchronous pattern and the TMCC pattern and sends a 8PSK signal resulting from the decoding to a trellis decoder 7 and at the same time sends a modulation discrimination data as to whether it is 8PSK, QPSK or BPSK to a control circuit 8 which comprises a micro computer and sends an enable signal to a loop filter 9.

The CNR measurement circuit 5 measures a CNR based on the distribution of vector by the inputted base band signals Id, Qd and sends the CNR data based on the CNR to the control circuit 8. The phase error detection circuit 6 is practically a look-up table and sends a phase error data, which is a phase difference between a receiving point comprising the inputted base band signals Id, Qd and a point where the received signals are to be converged, to the control circuit 8 and the loop filter 9. The trellis decoder 7 trellis-decodes the 8PSK-modulating signal and sends a bit error rate data (BER) of the transmission path in a 8PSK-modulating section to the control circuit 8.

On the other hand, the phase error data detected in the phase error detection circuit 6 is sent to the loop filter 9, which comprises a digital filter. The output of the loop filter 9 processed with a filter treatment in the loop filter 9 is sent to an automatic frequency control circuit 10, and the output from the automatic frequency control circuit 10 is sent to the numeric control oscillator 2. The numeric control oscillator 2 outputs a $\sin \theta$ data and a $\cos \theta$ data based on the output from the automatic frequency control circuit 10 and supply them to the complex-number arithmetic operation circuit 1.

The base band signals I, Q which receive the oscillating output from a fixed frequency oscillator and orthogonally detected and are rotating at the frequency which is the difference between the oscillating frequency of the fixed frequency oscillator and an actual carrier frequency, the sine data and the cos θ data are calculated in the complex-number arithmetic operation circuit 1, thereby forming and outputting base band signals Ir, Qr which are synchronized by being rotated in reverse to the above described rotation.

The control circuit 8 sends a normal reception signal indicating that it is in a normal receiving state to the decoder 4 and, upon receipt of the modulation discrimination data outputted from the decoder 4, the CNR data outputted from the CNR measurement circuit 5, the phase error data outputted from the phase error detection circuit 6 and the bit error rate data outputted from the trellis decoder, controls itself for a burst symbol reception when it is not in a normal receiving state and makes the decoder 4 to supply an enable signal to the loop filter 9 during the burst symbol reception, thereby controlling the loop filter 9 in an enable state.

Moreover, upon receipt of the modulation discrimination data, the CNR data, the phase error data and the bit error rate data, the control circuit 8 controls itself for the burst symbol reception when it is not in a sate of normal reception. At the same time, based on the CNR data and the bit error rate data, it functionally comprises detection means for substantially detecting the phase noise characteristics of the ODU and characteristics setting means for setting the characteristics of the carrier regenerative loop based on the detected phase noise characteristics of the ODU, thereby setting the filter characteristics of the loop filter 9 to the optimum filter characteristics based on the phase noise characteristics of the ODU. Also, the control circuit 8 sends a control signal to the automatic frequency control circuit 10 and performs the scanning of a carrier frequency.

Figure 3:
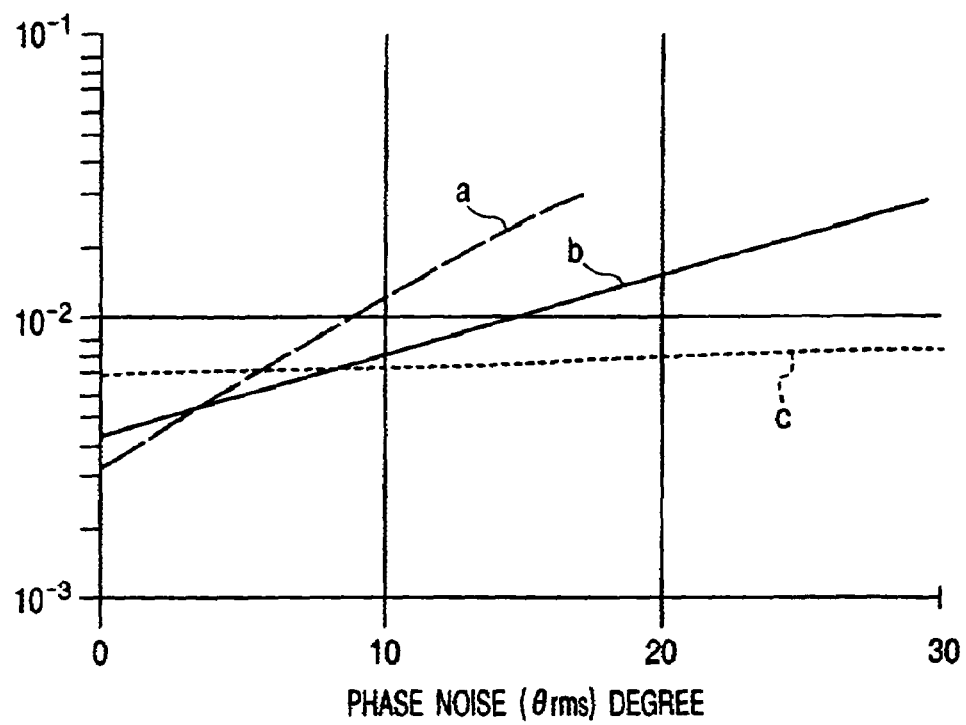
FIG. 3 is a characteristic diagram showing a bit error rate due to the phase noise of a 8PSK-modulating signal in a burst symbol reception of the digital satellite broadcast receiver according to an embodiment of the present invention.
Figure 4:
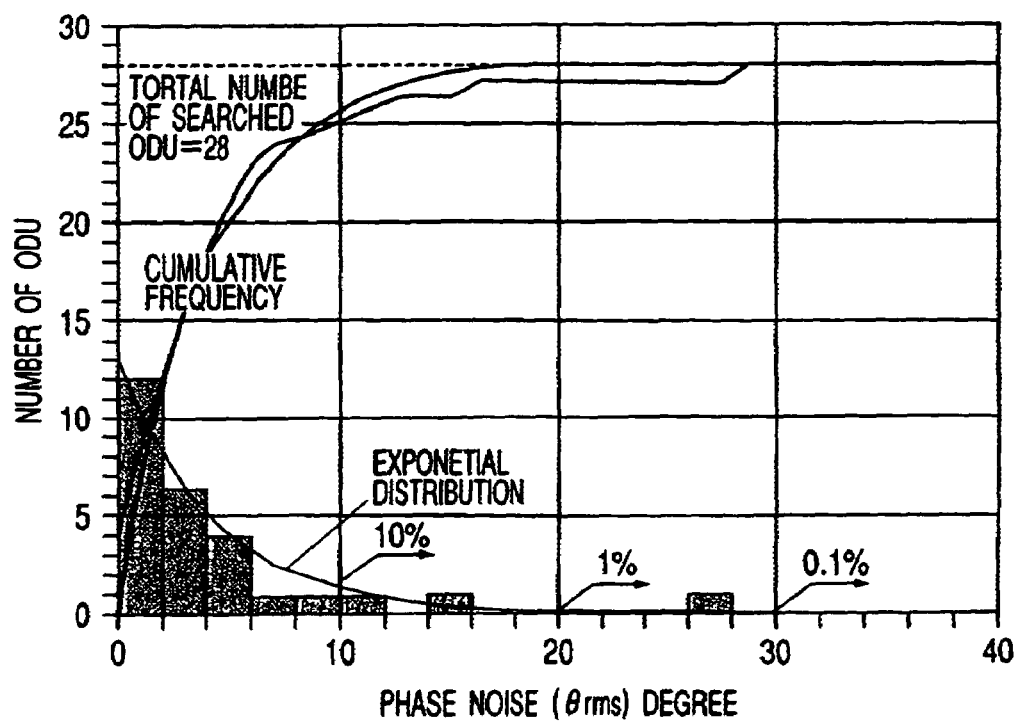
FIG. 4 is a distribution diagram of the phase noise characteristics of an ODU.
Figure 5:
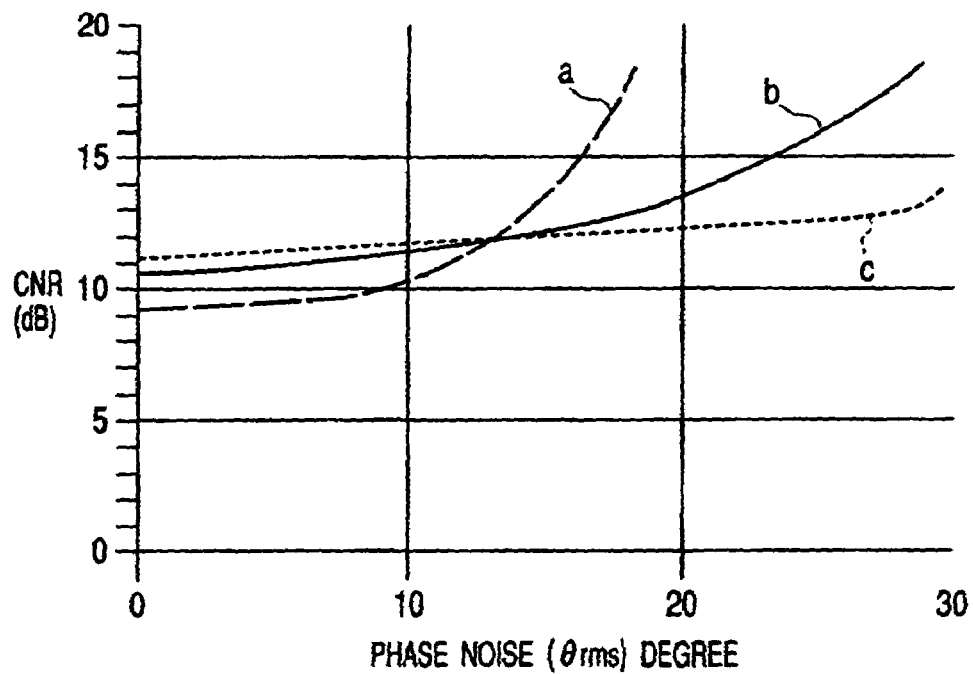
FIG. 5 is a characteristic diagram showing a critical CNR by the phase noise of the 8PSK-modulating signal in the burst symbol signal.
Figure 6:
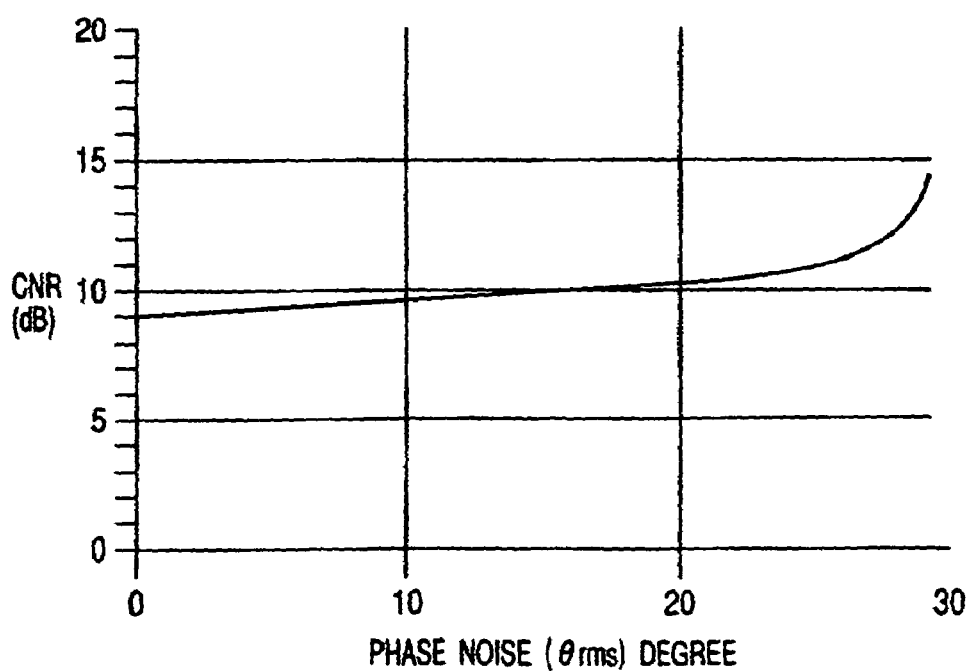
FIG. 6 is a characteristic diagram showing the critical CNR by the phase noise of the 8PSK-modulating signal in a continuation reception.
Figure 7:
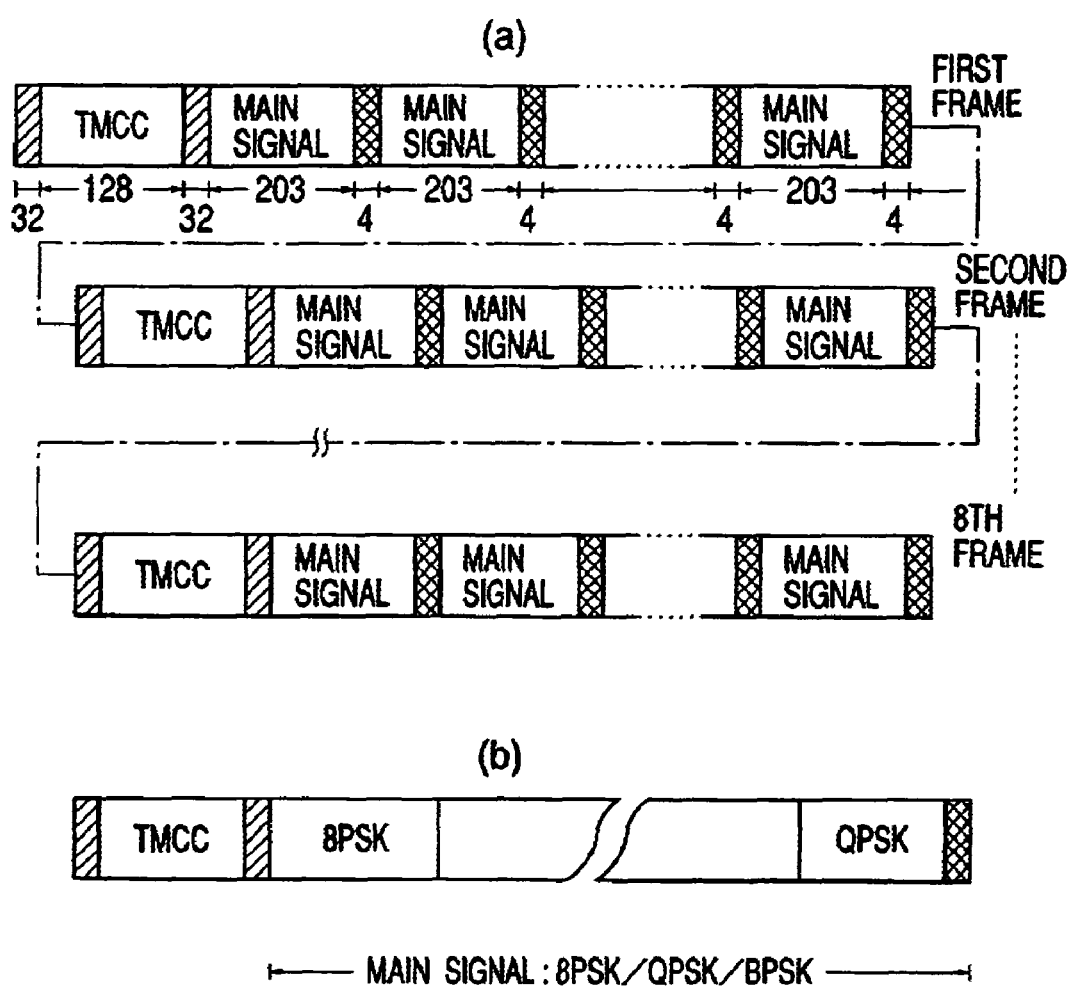
FIG. 7 is a type view showing a modulating signal array in the digital satellite broadcast.

Next, for example, the bit error rate characteristics by the phase noise of the 8PSK in the burst symbol reception at a time when the CNR is 15 dB are as shown in FIG. 3. The characteristics a, b and c as shown in FIG. 3 are the bit error rates in the case where they are respectively set to the characteristics a, b and c as shown in FIG. 5. The characteristic a as shown in FIG. 3 corresponds to the characteristic a as shown in FIG. 5 and the characteristic b as shown in FIG. 3 corresponds to the characteristic b as shown in FIG. 5 and the characteristic c as shown in FIG. 3 corresponds to the characteristic c as shown in FIG. 5.

Figure 2:
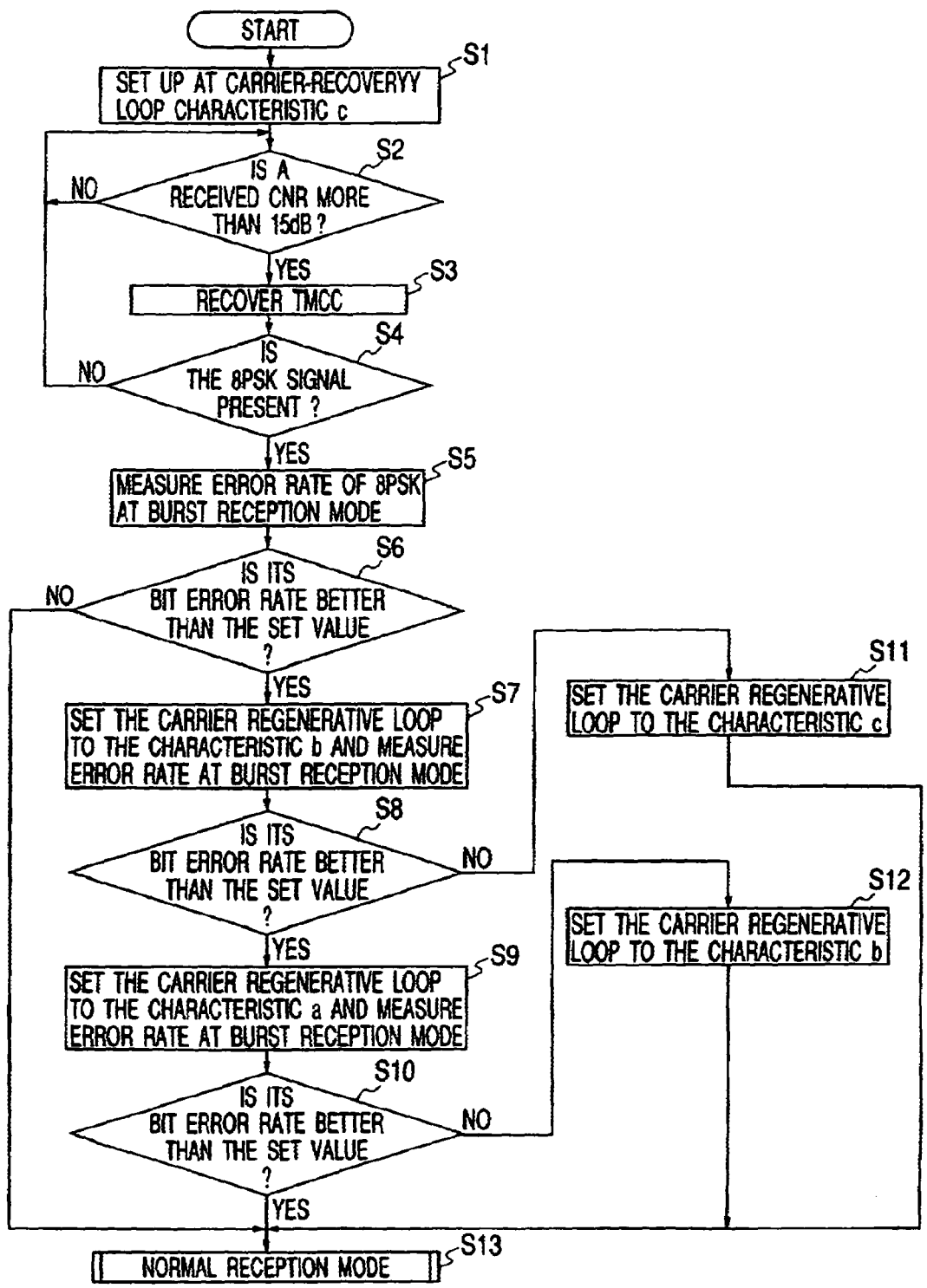
FIG. 2 is a flowchart provided for explaining the operation of the digital satellite broadcast receiver according to an embodiment of the present invention.

Next, the operation of the digital satellite broadcast receiver according to an embodiment of the present invention will be described based on FIG. 2.

At an initial state, that is, when a receiving state is not in a normal receiving state, it is controlled for the burst symbol reception and the loop filter 9 is controlled for the enable state and then the filter factor of the loop filter 9 is set to the characteristic where the characteristics of the carrier regenerative loop correspond to the characteristic c of FIG. 5 (step S1). Following the step S1, a received CNR is determined from the CNR data and a waiting is made till the determined CNR becomes 15 dB. When the determined CNR becomes 15 dB (step S2), a transmission and multiplexing configuration control (TMCC) pattern is decoded (step S3) and a presence of the 8PSK signal is confirmed (step S4).

Next, the 8PSK-modulating signal is burst-received and its bit error rate data is detected (step S5). This bit error rate data is a bare bit error rate of a transmission path and can be obtained from the trellis decoder 7. It is checked to see if it is better than the bit error rate for the received CNR (step S6). This is the case where the characteristics of the carrier regenerative loop are set to the characteristic c and the detected bit error rate is checked to see if it is, for example, equal to or less than $8\times10^{-3}$.

In the step S6, when the detected bit error rate is recognized to be better than a predetermined bit error rate for the received CNR, that is, for example, when the bit error rate is recognized to be equal to or less than $6.8\times10^{-3}$, the phase noise characteristics of the ODU connected to the receiver are determined to be good so that the filter factor of the loop filter 9 is set to the characteristic where the characteristics of the carrier regenerative loop correspond to the characteristic b of FIG. 5. Then the 8PSK-modulating signal is burst-received again and its bit error rate is detected (step S7) and the detected bit error rate is checked to see if it is better than the predetermined bit error rate (step S8). This is the case where the characteristics of the carrier regenerative loop are set to the characteristic b and the detected bit error rate is checked to see if it is, for example, equal to or less than $5.5\times10^{-3}$.

In the step S6, when the detected bit rate is recognized not to be better than the predetermined bit error rate for the received CNR, that is, for example, when the detected bit error rate is recognized to be more than $6.8\times10^{-3}$, the phase noise characteristics of the ODU connected to the receiver are determined not to be good so that the burst reception mode is released while the characteristics of the carrier regenerative loop remain set to the characteristic c of FIG. 5, thereby executing a normal reception mode to start the normal reception (step S13).

In the step S8, when the detected bit error rate is recognized to be better than the predetermined bit error rate for the received CNR, that is, when the detected bit error rate is recognized to be equal to or less than $5.5\times10^{-3}$, the phase noise characteristics of the ODU connected to the receiver are determined to be fairly good so that the filter factor of the loop filter 9 is set to the characteristic where the characteristics of the carrier regenerative loop correspond to the characteristic a of FIG. 5. Then the 8PSK-modulating signal is burst-received again and its bit error rate is detected (step S9) and the detected bit error rate is checked to see if it is better than the predetermined bit error rate (step S10). This is the case where the characteristics of the carrier regenerative loop are set to the characteristic a and the detected bit error rate is checked to see if it is, for example, equal to or less than $4.5\times10^{-3}$.

In the step S8, when the detected bit error rate is recognized not to be better than the predetermined bit error rate for the received CNR, that is, for example, when the detected bit error rate is recognized to be more than $5.5\times10^{-3}$, the phase noise characteristics of the ODU connected to the receiver are determined not to be good so that the characteristics of the carrier regenerative loop are restored to the characteristic c of FIG. 5 (step S11) and the burst reception mode is released, thereby executing the normal reception mode to start the normal reception (step S13).

In the step S10, when the detected bit error rate is recognized to be better than the predetermined bit error rate for the received CNR, that is, for example, when the detected bit error rate is recognized to be equal to or less than $4.5\times10^{-3}$, the phase noise characteristics of the ODU connected to the receiver are determined to be good so that the burst reception mode is released while the characteristic of the carrier regenerative loop remains set to the characteristic a of FIG. 5, thereby executing the normal reception mode to start the normal reception (step S13).

In the step S10, when the detected bit error rate is recognized not to be better than the predetermined bit error rate, that is, for example, when the detected error rate is recognized to be more than $4.5\times10^{-3}$, the performance of the ODU connected to the receiver are determined not to be good so that the characteristics of the carrier regenerative loop are restored so as to be set to the characteristic b of FIG. 5 (step S12) and the burst reception mode is released, thereby executing the normal reception mode to start the normal reception (step S13).

As described above, according to the digital satellite broadcast receiver in accordance with one aspect of the embodiment of the present invention, when the receiving condition is good (at a high CNR), the 8PSK-modulating signal is received in the burst reception mode and its bit error rate is measured to practically determine the phase noise of the ODU connected to the receiver. Therefore, the phase noise thus measured has a reliability and can be set to an optimum characteristic of the carrier regenerative loop in case of using the digital only or the existing high performance ODU, thereby lowering a received critical CNR and improving the probability of reception. Also, because the phase noise is not set to the characteristics of the carrier regenerative loop which exceed the critical CNR even during the reception, there will be no problem even if it is measured during the reception. Accordingly, when the phase noise characteristics of the ODU is good, the variations in the bit error rate due to the difference of the receiving system (burst or continuation) can be restricted to the minimum.

As described above, according to the radio digital signal receiver in accordance with the present invention, the phase noise characteristics of the ODU is detected and the detected characteristic of the phase noise of the ODU is set to the optimum characteristic of the carrier regenerative loop, thereby achieving the effect of lowering the received critical CNR and improving a receiving performance.

As described above, while the configuration and the operation of the present invention was wholly described with reference to the digital satellite broadcast receiver as an example, the application of the present invention is not limited to the digital satellite broadcast receiver. It should be understood that the technological scope of the present invention is not limited to the above-exemplified embodiment, but that the present invention is applicable widely to the whole of the radio digital receivers without deviating from its principle.

The invention claimed is:

1. A radio digital signal receiver for receiving a broadcast signal obtained by multiplexing an 8PSK-modulating signal, a QPSK-modulating signal and a BPSK-modulating signal, the receiver comprising:

means for individually detecting a received C/N (5) and a decoding error rate of a decoded digital signal (7);

decision means (8) for estimating and deciding phase noise characteristics of a local oscillator in an outdoor unit connected to a receiving terminal of the radio digital signal receiver on the basis of a decoding error rate, in a burst symbol reception mode for regenerating a carrier from only the received BPSK-modulating signal the detected decoding error rate being one detected when the received C/N exceeds a first predetermined threshold value; where if the detected decoding error rate is equal to or less than a second predetermined threshold, the phase noise characteristics are determined to be fairly good, while if the detected decoding error rate exceeds the second predetermined threshold, the phase noise characteristics are determined not to be good;

means (8) for selecting and switching characteristics of a carrier regenerative loop (1, 3, 6, 9, 10, 2) on the basis of the estimated phase noise characteristics of the local oscillator in the outdoor unit, wherein the means for selecting and switching a carrier regenerative loop characteristic is adapted to operate so that (i) if it is determined by the decision means that the phase noise characteristics are fairly good, a carrier regenerative loop characteristic corresponding to a critical CNR where a noise bandwidth is made narrow is selected and (ii) if it is determined by the decision means that the phase noise characteristics are not good, a carrier regenerative loop characteristic corresponding to a critical CNR where the noise bandwidth is made large is selected; and means (8) for shifting the operation of the receiver from the burst symbol reception mode to a continuation reception mode after selecting and switching the carrier regenerative loop characteristic, the continuation reception mode allowing a carrier to be regenerated one by another from respective ones of the received 8PSK-modulating signal, QPSK-modulating signal and BPSK-modulating signal.

2. The radio digital signal receiver according to claim 1, wherein said means for selecting and switching the carrier loop characteristics sets a filter factor of a loop filter (9) inserted into the carrier regenerative loop (1, 3, 6, 9, 10, 2).

3. The radio digital signal receiver according to claim 2, wherein said means for selecting and switching the carrier regenerative loop characteristics changes the filter factor of a loop filter (9) inserted into the carrier regenerative loop (1, 3, 6, 9, 10, 2).

4. A signal processing method used in a radio digital signal receiver for receiving a broadcast signal obtained by multiplexing an 8PSK-modulating signal, a QPSK-modulating signal and a BPSK-modulating signal and for down-converting received modulation signals by using a down-converter, demodulating the received modulating signals by using a regenerated carrier and decoding a digital signal from demodulated signals, said method comprising the steps of:

detecting a received C/N of said received modulating signals on the basis of said demodulated signals;

determining whether said detected received C/N exceeds a first predetermined threshold value;

when said received C/N is determined to exceed said first predetermined threshold value, detecting a decoding error rate of a decoded digital signal, wherein the decoding error rate to be detected is a bit error rate of the received 8PSK-modulating signal, which is demodulated in a burst symbol reception mode for regenerating a carrier from only the received BPSK-modulating signal and PSK-modulating signals;

comparing the magnitude of the detected decoding error rate with a second predetermined threshold value, where if the detected decoding error rate is equal to or less than the second predetermined threshold, the phase noise characteristics of the down-converter are determined to be fairly good, while if the detected decoding error rate exceeds the second predetermined threshold, the phase noise characteristics of the down-converter are determined not to be good, the determination being made on the basis of a decoded error rate and a phase noise of a local oscillator in the down-converter, and selecting and switching the characteristic of a carrier regenerative loop on the basis of the phase noise characteristics of the down-converter, wherein the step for selecting and switching the carrier regenerative loop characteristics is performed so that (i) if it is determined that the phase noise characteristics are fairly good, a carrier regenerative loop characteristic corresponding to a critical CNR where a noise bandwidth is made narrow is selected, and (ii) if it is determined that the phase noise characteristics are not good, a carrier regenerative loop characteristic corresponding to a critical CNR where the noise bandwidth is made large is selected; and shifting the operation of the receiver from the burst symbol reception mode to a continuation reception mode after selecting and switching the carrier regenerative loop characteristic, the continuation reception mode allowing a carrier to be regenerated one by another from respective ones of the received 8PSK-modulating signal, QPSK-modulating signal and BPSK-modulating signal.

* * * * *